(No Model.)
C. L. CLARKE & J. LEIGH.
ELECTRIC BATTERY.
No. 293,563. Patented Feb. 12, 1884.
FIG:1.  FIG:2.  FIG:3.
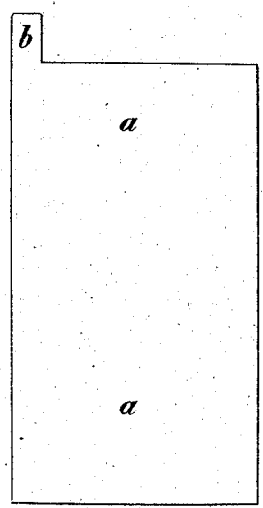
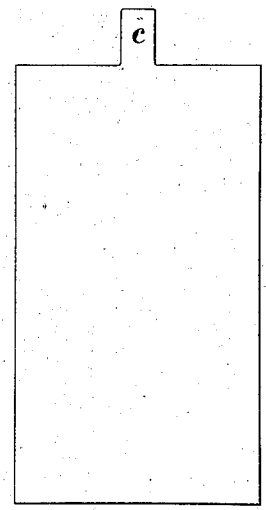
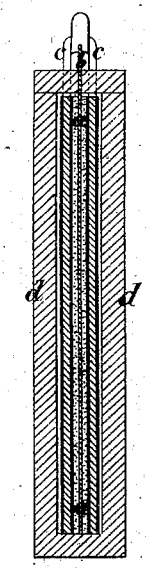
FIG:4.
FIG:5.  FIG:6.
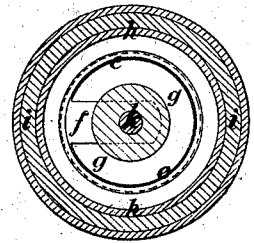
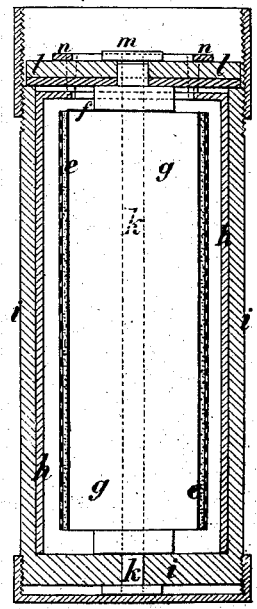
Witnesses
Harry Drury
Harry Smith
Inventors
Charles Leigh Clarke
and
John Leigh
by their Attorneys
Howson & Sons

UNITED STATES PATENT OFFICE.

CHARLES L. CLARKE AND JOHN LEIGH, OF MANCHESTER, COUNTY OF LANCASTER, ENGLAND, ASSIGNORS TO THE DOMESTIC ELECTRIC MANUFACTURING COMPANY, OF NEW YORK, N. Y.

ELECTRIC BATTERY.

SPECIFICATION forming part of Letters Patent No. 293,563, dated February 12, 1884.

Application filed March 20, 1882. (No model.) Patented in England March, 1, 1882, No. 985; in France March 11, 1882, No. 147,830; in Belgium March 14, 1882, No. 57,354; in Germany March 31, 1882, No. 21,985; in Canada April 8, 1882, No. 14,563; in Italy April 10, 1882, No. 14,079; in Austria June 24, 1882, No. 11,800, and in Spain August 1, 1882, No. 2,859.

*To all whom it may concern:*

Be it known that we, CHARLES LEIGH CLARKE and JOHN LEIGH, both residing in Manchester, in the county of Lancaster, England, and subjects of the Queen of Great Britain and Ireland, have invented certain new and useful Improvements in Electric Batteries, for which British Letters Patent No. 985, March 1, 1882, were granted to us, and of which the following is a specification.

Our present improvements in electric batteries are more particularly designed to be applied to our electric gas-lighters, for which United States patents were granted to us April 26, 1881, No. 240,661, and July 25, 1882, No. 261,677; but our improvements are also applicable to batteries for various other uses.

In the accompanying drawings, Figure 1 is a side view of one of the elements of the cell of a battery; Fig. 2, a side view of another element; Fig. 3, a sectional view of a single cell-battery; Fig. 4, a vertical section of a modification; Fig. 5, a sectional plan; and Fig. 6, a plan view of the battery, Fig. 4.

In constructing our improved battery in the flat form illustrated in Figs. 1, 2, and 3, suitable for the gas-lighter illustrated in our first patent above mentioned, we take a rectangular piece of thin silver-foil, $a\ a$, Fig. 1, on each side of which we lay a coating (about one-eighth of an inch thick) of chloride of silver in a dry powdered state, keeping the latter in place by wrapping round the whole a single fold of blotting-paper, the silver-foil being provided with a projecting lug, $b\ b$, to which one of the wires is to be connected. On each side we then lay a piece of zinc plate, Fig. 2, of about the same size, each plate being provided with a projecting lug, $c\ c$, at one end or side, for forming the connection with the other wire. The whole is then wrapped again in one fold of blotting-paper, which is held in position by two or three elastic bands. It is next subjected to pressure in a screw-press or otherwise, to solidify the chloride of silver. It is then placed in a small ebonite or wooden box or cell, $d\ d$, as seen at Fig. 3, containing the exciting-fluid, which is a saturated solution of sulphate of sodium of a specific gravity of from eighteen to twenty-seven degrees, or thereabout, the quantity of fluid being rather more than will be absorbed by the blotting-paper. The reason of using sodic sulphate in this cell is to prevent the waste of silver chloride, so troublesome in the cells in which a moderately-strong solution of any of the chlorides for the exciting-fluid is used, such as a solution of zincic chloride or ammonic chloride. This waste is caused by the silver chloride being soluble more or less in such a solution, and when silver chloride in solution is brought in contact with the zinc it is decomposed, the silver being deposited upon the surface of the zinc-electrode, producing local action, as well as causing the great waste of silver chloride. Sodic-sulphate solution being entirely free from this property of dissolving silver chloride, and being also a good conductor, we employ it with advantage in our cells, instead of the usual solution of one of the chlorides, it being evident that no deposition of silver upon the zinc takes place so long as the cell is not worked; consequently no local action is set up, and when the cell is in use the formation of zincic chloride is slow and the quantity formed making but a weak solution. The solvent action upon the silver chloride is practically *nil;* hence this cell is durable as well as constant.

During the working of the cell the silver of the silver chloride is deposited upon the negative electrode, the chlorine combining with sodium of the sodic sulphate to produce sodic chloride, and the sulphuric acid radical unites with the zinc, producing zincic sulphate, as represented by the following equation:

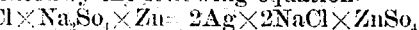

There is then, probably, a secondary reaction of the zincic sulphate with the sodic chloride, as represented by the following equation:

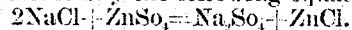

Instead of the sodic sulphate we may use potassic sulphate or ammonic sulphate in a diluted solution.

In constructing our improved battery in the cylindrical form, as suitable for the electric gas-lighter described in our second patent, we proceed as follows: Upon a smooth flat surface or slab we lay a piece of muslin, blotting-paper, or other suitable material. Over this we place a layer of chloride of silver, about one-eighth of an inch in thickness, which we cover with a piece of thin silver-foil, e e, having a projecting lug, f, for connection. Above this we place a second plate or slab and submit the whole to pressure to solidify the dry chloride. We then remove the top slab, and placing on the silver-foil a cylindrical core, g g, of ebonite or other suitable material, we roll the silver-foil with its adherent coating of chloride of silver round it, with the muslin outward, and then bind the whole together by a few turns of thread or in any other suitable manner. Outside this we place a tube, h h, of zinc, leaving a cylindrical space between them of about an eighth of an inch. This battery is placed in a cell, i i, of a tubular form, composed of vulcanite or other suitable material, into which the zinc tube h h fits, and a metallic bolt, k k, is passed through the center of the core and cell i i. The exciting-fluid being added, the top plate, l l, of vulcanite, is placed on (over an india-rubber washer) and the nut m screwed onto the end of the bolt k k, which holds all together securely and prevents leakage. As the central bolt passes through the lug g of the silver-foil f f, it establishes a connection with one pole of the battery, and the zinc h h is similarly connected to a brass ring, n n, outside the vulcanite top l l, by means of three zinc screws, o o o, which pass through the vulcanite l l and into a flange at the top of the zinc tube h h.

If preferred, the arrangement of the elements of this battery may be reversed—that is to say, a zinc core, with silver-foil outside and the chloride between—or the order may be silver, zinc, silver; or zinc, silver, zinc.

The exciting-fluids which we employ with this battery are a diluted solution of sodic sulphate, or of potassic sulphate, or ammonic sulphate.

It will be evident that although these forms of our improved battery are specially adapted for use in our improved electric gas-lighters, our improvements may be applied to other forms of batteries with good effect.

We claim as our invention—

An electric-battery cell consisting of a case containing zinc and silver-foil and chloride of silver, with a solution of an alkaline sulphate as an excitant, substantially as described.

In testimony whereof we have signed our names to this specification in the presence of two subscribing witnesses.

CHAS. L. CLARKE.
JOHN LEIGH.

Witnesses:
JOHN HUGHES,
W. BOLSOVER.